United States Patent
Bolotski et al.

[19]
[11] Patent Number: 6,108,000
[45] Date of Patent: Aug. 22, 2000

[54] RESONANT DRIVER APPARATUS AND METHOD

[75] Inventors: Michael Bolotski, Berkeley; Phillip Alvelda, Oakland, both of Calif.

[73] Assignee: MicroDisplay Corporation, San Pablo, Calif.

[21] Appl. No.: 09/034,862

[22] Filed: Mar. 4, 1998

Related U.S. Application Data

[60] Provisional application No. 60/040,330, Mar. 5, 1997.

[51] Int. Cl.⁷ .................. G09G 5/00; G09G 3/36
[52] U.S. Cl. .............................. 345/212; 345/98
[58] Field of Search .................. 345/204, 211, 345/212, 213, 214, 98, 99, 87; 307/108; 315/169.2, 169.3; 324/633, 655, 668, 675, 682, 708; 322/78

[56] References Cited

U.S. PATENT DOCUMENTS

| | | | |
|---|---|---|---|
| 4,349,816 | 9/1982 | Miller et al. | 315/169.3 |
| 4,595,920 | 6/1986 | Runyan | 345/211 |
| 4,633,141 | 12/1986 | Weber | 315/169.3 |
| 4,707,692 | 11/1987 | Higgins et al. | 345/204 |
| 4,733,228 | 3/1988 | Flegal | 345/212 |
| 4,769,753 | 9/1988 | Knudson et al. | 307/110 |
| 4,859,911 | 8/1989 | Kinnard et al. | 315/169.3 |
| 4,954,752 | 9/1990 | Young et al. | 315/169.3 |
| 5,260,606 | 11/1993 | Young | 345/211 |
| 5,559,402 | 9/1996 | Corrigan, III | 315/169.3 |
| 5,559,478 | 9/1996 | Athas et al. | 307/108 |
| 5,576,601 | 11/1996 | Koenck et al. | 345/211 |
| 5,793,342 | 8/1998 | Rhoads | 345/211 |
| 5,821,923 | 10/1998 | Van Amesfoort et al. | 345/212 |
| 5,838,113 | 11/1998 | Mihara | 315/169.3 |
| 6,014,124 | 1/2000 | Dickinson et al. | 345/212 |

*Primary Examiner*—Steven J. Saras
*Assistant Examiner*—Paul A. Bell
*Attorney, Agent, or Firm*—Townsend and Townsend and Crew LLP

[57] ABSTRACT

A system having a display including display circuitry operating at a resonant frequency includes a tunable component, a resonant driver circuit coupled to the tunable component and to the display circuitry, for driving the display circuitry at an output frequency, a power consumption sensor coupled to the resonant driver circuit, for determining the power consumption of the resonant driver circuit, and a control logic coupled to the tunable component and to the power dissipation sensor, for monitoring the power consumption of the resonant driver circuit and for tuning the tunable component in response to the power consumption.

20 Claims, 8 Drawing Sheets

RESONANT DRIVER APPARATUS AND METHOD

CROSS REFERENCE TO RELATED APPLICATIONS

This application claims priority from the provisional patent application entitled RESONANT DRIVERS FOR DISPLAY APPLICATIONS AND DIGITAL TO ANALOG CONVERTERS, filed Mar. 5, 1997 and assigned application Ser. No. 60/040,330, the disclosure of which is hereby incorporated in its entirety for all purposes.

BACKGROUND OF THE INVENTION

The present invention relates to resonant drivers. More specifically, the present invention relates to resonant drivers providing periodic electronic signals with low power dissipation. Further, the present invention relates to methods for automatically tuning of resonant drivers. Further, the present invention relates to resonant display drivers and methods for operating resonant display drivers in liquid crystal displays. Further, the present invention relates to resonant digital to analog converters and methods of operation.

Resonant drivers are part of a family of circuit designs that are used to provide periodic electronic signals with low power dissipation. This area of technology is also termed harmonic driving, adiabatic charging or switching. Typical applications for such resonant drivers include generating and distributing of clock signals for computer displays, for memory chips, for microprocessors, etc. Resonant drivers typically include LRC portions that are characterized by resonant frequencies. When the resonant frequency of an LRC portion of a resonant driver matches the frequency of the periodic signal being driven, the power required to provide the periodic signals is significantly reduced.

Practical problems with the implementation of resonant drivers include that the resonant frequency is highly dependent upon the actual values of capacitive and inductive elements used. Although capacitors and inductors include "nominal" values, the "actual" values of these elements vary significantly from batch to batch, supplier to supplier, and component by component. Causes of these variations include variations in manufacturing precisions, variations in temperature, variation in load, variations in quality of materials, etc. Because of these variations, a resonant driver will have an output frequency that typically is different from the resonant frequency the resonant driver is designed to operate at. As a result of this difference, the amount of power saved by the addition of resonant drivers is small.

As a result of the above problems, current methods for constructing and tuning of resonant drivers are manually performed. For example, the capacitive, inductive, and resistive loads of a load circuit must first be manually characterized, and then specific capacitive and inductive elements of an LRC portion must then be manually selected so as to obtain the desired resonant frequency. Such inefficiencies inhibit the use of resonant drivers in a wide variety of applications.

What is needed are improved resonant driver circuits and tuning methods.

Liquid crystal displays (LCDs) are displays that are used to display analog or digital data from computers, television signals, etc. LCDs operate by establishing particular voltages across pixel on the display, with the particular voltage affecting the optical properties of the LC material. Voltages are typically applied to each pixel on the display by using a row conductor and column conductors. Because row and column conductors are relatively long and highly capacitive, charging and discharging of these conductors and pixels dissipates a substantial amount of energy. The amount of power dissipated is significant because current refresh rates of display pixels are at rates of up to 120 MHz. In general, the power dissipation of conductors is given by the expression:

$$\text{power dissipation} = \text{frequency} * \text{capacitance of the wire} * (\text{voltage})^2$$

Previous techniques for reducing power dissipation have concentrated on reducing the capacitance and the voltage, with limited success. However, what is required are improved methods and apparatus for further reducing power dissipation of liquid crystal displays.

Digital to analog converters (DACs) are typically used to convert digital values to analog voltages. In a typical DAC, a voltage source is provided for generating the analog output voltage, in response to a digital value. Because DACs typically drive highly capacitive loads, the power required for supplying typical DACs is large.

What is required are improved methods and apparatus for reducing power dissipation of digital to analog converters.

SUMMARY OF THE INVENTION

The present invention relates to resonant drivers for providing periodic electronic signals with low power and methods for automatically tuning of resonant driver circuits. The family of circuit designs described herein automatically compensate for variations in resonant driver circuit components as well as variations in the load circuit. More particularly, the present invention relates to using resonant drivers to drive the highly capacitive row and column conductors.

According to one embodiment, an apparatus for converting a digital value to an analog value includes a resonant clock circuit for providing a resonant clock signal having a time-dependent value, a digital clock circuit for providing a digital clock signal having a time-dependent digital value responsive to the time-dependent value, and a storage for storing the digital value. The invention also includes a comparator coupled to the digital clock circuit and to the storage, the comparator for asserting a first voltage signal when the digital value exceeds the time-dependent digital value and for asserting a second voltage signal when the time-dependent digital value exceeds the digital value, and a switch coupled to the resonant clock signal and to the comparator, the switch for coupling the resonant clock circuit to an output in response to the first voltage signal, and for decoupling the resonant clock circuit from the output in response to the second voltage signal.

According to another embodiment of the present invention, a method for converting a digital value to an analog value, includes the steps of storing the digital value into a storage, and providing a resonant clock signal having a time-dependent value and a digital clock signal having a time-dependent digital value responsive to the time-dependent value. The invention also includes the steps of comparing the time-dependent digital value to the digital value, asserting a first voltage signal when the digital value exceeds the time-dependent digital value, asserting a second voltage signal when the time-dependent digital value exceeds the digital value, coupling the resonant clock circuit to an output in response to the first voltage signal, and decoupling the resonant clock circuit from the output in response to the second voltage signal.

According to one embodiment, a method for forming a resonant driver for driving a load circuit at a resonant frequency, includes the steps of providing a bank of tunable components, providing a resonant driver circuit coupled to the bank of tunable components and to the load circuit, and driving the load circuit with the resonant driver circuit at approximately the resonant frequency. The method also includes the steps of providing a power dissipation sensor coupled to the resonant driver circuit, determining the power dissipation of the resonant driver circuit, providing a control circuit coupled to the power dissipation sensor and to the bank of tunable components, and tuning the bank of tunable components with the control circuit in response to the power dissipation of the resonant driver circuit.

According to another embodiment of the present invention, a system coupled to an external reference element having a display including display circuitry operating at a resonant frequency, the system includes a bank of tunable components, a resonant driver circuit coupled to the bank of tunable components and to the display circuitry, for driving a signal for the display circuitry at an output frequency, and an internal reference element. The system also includes a reference sensor coupled to the resonant driver circuit and to the external reference element, for determining a difference between the external reference element and the internal reference element, and control logic coupled to the bank of tunable components and to the reference sensor, for monitoring the difference and for tuning the bank of tunable components in response to the difference.

According to another embodiment, a display driver for driving a data column in a liquid crystal display with a video signal includes a resonant clock circuit for providing a resonant clock signal having a time-dependent value, and a sampling circuit for sampling the video signal to form a sampled signal having a sampled value. The display driver also includes a comparator coupled to the resonant clock circuit and to the sampling circuit, the comparator for asserting a first signal when the time-dependent value is less than the sampled value, and for asserting a second signal when the time-dependent value is greater than sampled value, and a switch coupled to the resonant circuit, to the comparator, and to the data column, the switch for coupling the resonant circuit to the data column in response to the first signal, and for decoupling the resonant circuit from the data column in response to the second signal.

According to another embodiment of the present invention, a method for driving a display element with a resonant clock signal having a time-dependent value, includes the steps of sampling a video signal to form a sampled value, and comparing the time-dependent value to the sampled value. The method also includes the step of coupling the resonant clock signal to the data column when the time-dependent value is less than the sampled value, and decoupling the resonant clock signal from the data column when the time-dependent value is greater than sampled value.

Further understanding of the nature and advantages of the invention may be realized by reference to the remaining portions of the specification and drawings.

DESCRIPTION OF SPECIFIC EMBODIMENTS

Resonant Drivers

First Embodiment

Figure 1:
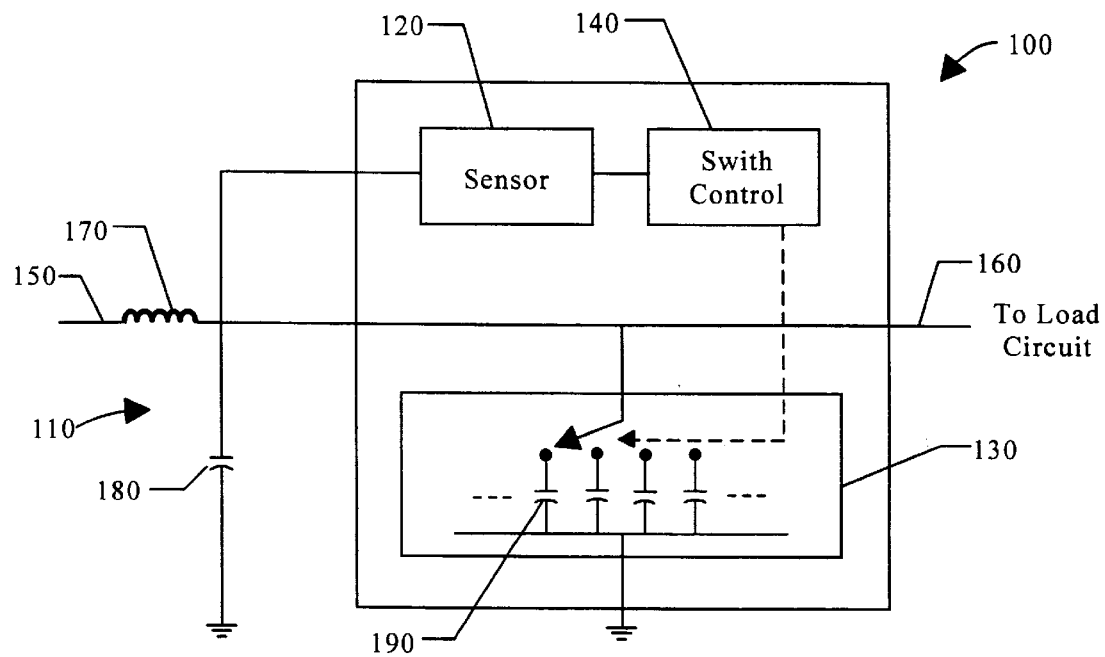
FIG. 1 is a block diagram of a resonant driver according to an embodiment of the present invention.

FIG. 1 is a block diagram of a resonant driver 100 according to an embodiment of the present invention. Resonant driver 100 includes a resonant driver circuit 110, a sensing circuit 120, a bank of tunable components 130, and a control logic 140. Resonant driver 100 includes signal lines 150 and 160.

Signal line 150 typically provides an input periodic signal having a periodic frequency to resonant driver circuit 110. Typical sources for the periodic signal include clock drivers. Signal line 160 typically provides an output periodic signal, preferably at the periodic frequency, to a load circuit.

In FIG. 1, resonant driver circuit 110 is embodied as an LC circuit having an output signal having an output frequency. In this embodiment, the load circuit is preferably capacitive and resistive, thus resonant driver circuit 110 preferably includes inductor 170 and capacitor 180. Other configurations of inductors and capacitors, in addition to active and passive elements, are contemplated in alternative embodiments of resonant driver circuit 110.

As illustrated in FIG. 1, bank of tunable components 130 is embodied as a variable capacitor or bank of capacitors. In this embodiment, capacitor 190 is coupled between signal line 160 and ground. Because capacitor 190 is coupled in parallel with capacitor 180, the effective capacitance of resonant driver circuit 110 changes. Further, the resonant frequency of resonant driver circuit 110 also changes.

In an alternative embodiment, capacitor 190 is coupled in series with capacitor 180, and in yet another embodiment, resonant driver circuit 110 comprises only inductor 170. In still other embodiments of the present invention, bank of tunable components 130 may comprise a bank of inductors or a bank of resistors. These components are also electronically selectable, thus the resonant frequencies of resonant driver circuit 110 are electronically selectable.

In the preferred embodiment of the present invention, bank of tunable components 130 are fabricated on the same VLSI chip as the load circuit.

Sensing circuit 120 monitors the past and present power dissipation, or power consumption, of resonant driver 100. Sensing circuit 120 may comprise any well known power sensing circuitry that monitors dissipation or power consumption. For example, sensing circuit 120 may be embodied as a current detector, an ammeter, a voltage detector, etc. The control signals from sensing circuit 120 are typically in response to the mean power consumed, the mean current consumed, the present power consumed, the power consumed at a previous sampling time, etc.

In the preferred embodiment of the present invention, sensing circuit 120 is also fabricated on the same VLSI chip as the load circuit.

Control logic 140 is coupled to sensing circuit 120 and to bank of tunable components 130. Control logic 140 serves as a feedback mechanism for adjusting bank of tunable components 130 based upon control signals from sensing circuit 120. In a particular embodiment, control logic 140 selects a capacitance from bank of tunable components 130 so that the average current dissipated or consumed by resonant driver circuit 110 is reduced or minimized. Other well-known feedback schemes may be utilized in different embodiments of the present invention.

In the preferred embodiment of the present invention, control logic 140 is fabricated on the same VLSI chip as the load circuit.

Figure 2:
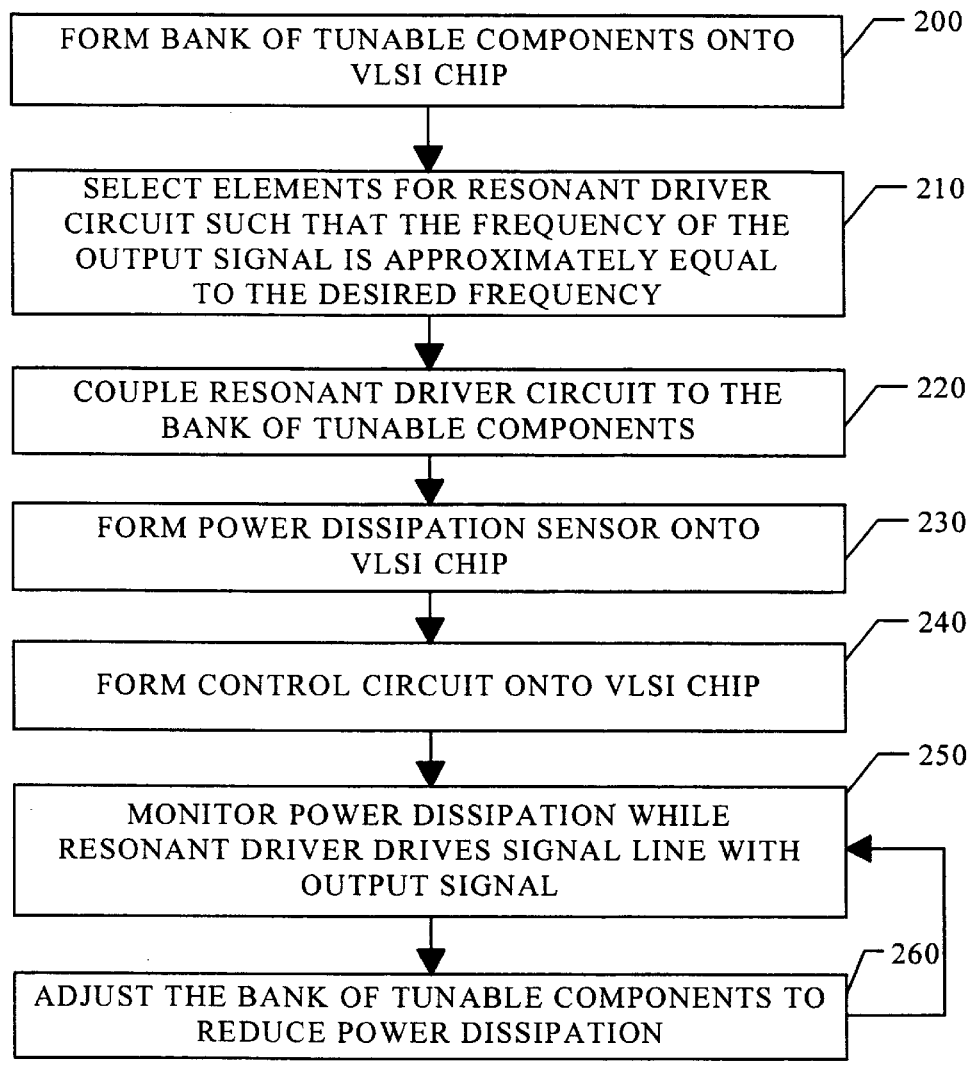
FIG. 2 illustrates a flow chart of a method for adjusting a resonant driver according to an embodiment of the present invention.

FIG. 2 illustrates a flow chart of a method for adjusting a resonant driver according to an embodiment of the present invention. FIG. 2 includes steps 200–260, with reference to the elements in FIG. 1 for sake of convenience.

Initially bank of tunable components 130 is formed on a VLSI chip, step 200. In step 210, the elements for resonant driver circuit 110 are selected such that the output frequency of the output signal from resonant driver circuit 110 is approximately equal to the desired resonant frequency, step 210. Resonant driver circuit 110 is then coupled to bank of tunable components 130, step 220.

In step 230, power dissipation sensor 120 is formed on the VLSI chip and is coupled to resonant driver circuit 110. Control circuit 140 is also formed on the VLSI chip and is coupled to power dissipation sensor 120 and to bank of tunable components 130, step 240.

Next, resonant driver circuit 110 drives signal line 160, while power dissipation sensor 120 monitors the power dissipated by resonant driver circuit 110, step 250. In response to power dissipation sensor 120, control circuit 140 tunes bank of tunable components 130, thereby reducing power consumption, step 260. As a result, the output frequency of resonant circuit 100 will be the desired resonant frequency.

In one embodiment of the present invention, bank of tunable components 130 is a bank of capacitors, and control circuit 140 selects a capacitance (capacitor 190) from the bank of capacitors.

Preferably, the above process is periodically repeated, thus the output frequency of resonant driver 100 is repeatedly monitored and adjusted. By continually fine-tuning the output frequency to the desired resonant frequency, the amount of power consumed is reduced.

Second Embodiments

Figure 3:
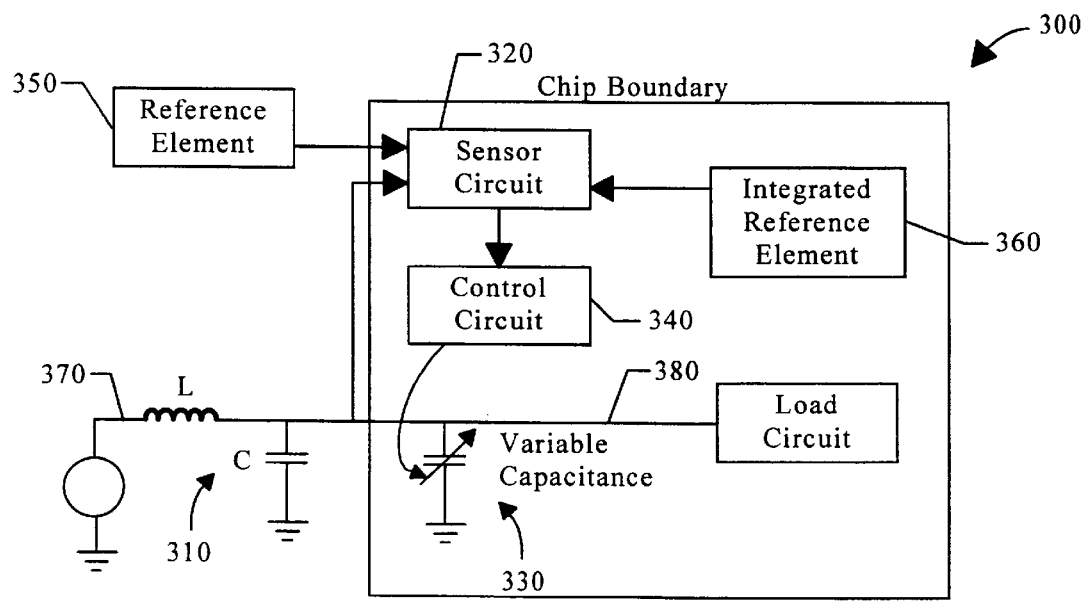
FIG. 3 is a block diagram of a resonant driver according to another embodiment of the present invention.

FIG. 3 is a block diagram of a resonant driver 300 according to another embodiment of the present invention. Resonant driver 300 includes a resonant driver circuit 310, a sensing circuit 320, a bank of tunable components 330, a control logic 340, an external reference element 350, and an internal reference element 360. Resonant driver 300 also includes signal lines 370 and 380.

Similar to the embodiment above, signal line 370 typically provides a periodic signal having a periodic frequency to resonant driver circuit 310, and signal line 380 typically provides a periodic signal, preferably at the periodic frequency, to a load circuit.

In FIG. 3, resonant driver circuit 310 is embodied as an LC circuit having an output signal having an output frequency approximately equal to the desired resonant frequency, described above. Preferably, the elements forming resonant driver circuit 310 are external to the VLSI chip hosting the load circuit.

Bank of tunable components 330 is preferably embodied as a bank of capacitors or a variable capacitor, as previously described. Bank of tunable components 330 is preferably fabricated on the same VLSI chip as the load circuit.

In FIG. 3, external reference element 350 and internal reference element 360 are provided for sensing circuit 320.

In one embodiment of the present invention, external reference element 350 is an external oscillator and internal reference element 360 is simply coupled to signal line 380. In another embodiment of the present invention, external reference element 350 is a high-precision capacitor and internal reference element 360 is a measure of a capacitance of bank of tunable components 330.

Sensing circuit 320 is provided to detect the difference between external reference element 350 and internal reference element 360.

In the former embodiment, above, sensing circuit 320 is embodied as a voltage-controlled oscillator (VCO). In particular, sensing circuit 320 comprises a phase detector that detects the difference in phase between an external oscillator (external reference element 350) and signal line 380; and a loop filter.

In the latter embodiment, sensing circuit 320 is embodied as a circuit that detects the actual capacitance of bank of tunable components 330. In particular, sensing circuit 320 comprises a portion that measures the capacitance of an external high-precision capacitor (external reference element 350) and a portion that determines the actual capacitance of bank of tunable components 330 in response.

Control logic 340 is coupled to sensing circuit 320 and to bank of tunable components 330. Control logic 340 serves as a feedback mechanism for adjusting bank of tunable components 330 based upon control signals from sensing circuit 320. In one embodiment of the present invention, bank of tunable components 330 is a variable capacitor, and control circuit 340 adjusts a capacitance of the variable capacitor.

In the former embodiment, above, in response to the phase difference from sensing circuit 320, control logic 340 adjusts bank of tunable components 330 until the phase difference is reduced. As a result, the output frequency of resonant circuit 300 will be the desired resonant frequency.

In the latter embodiment, above, in response to the actual measured capacitance of a capacitance in bank of tunable components 330, control logic 340 selects an appropriate capacitance from the bank of tunable components 330. Because the actual capacitance of bank of tunable components 330 is calculated, control logic 340 can select the appropriate capacitance to produce the desired resonant frequency.

Sensing circuit 320 and control logic 340 are both preferably fabricated on the same VLSI chip as the load circuit.

Figure 4:
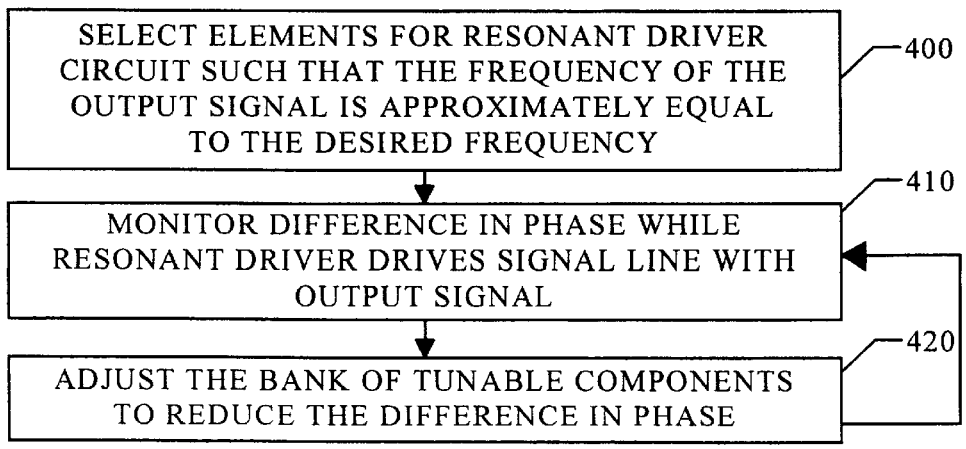
FIG. 4 illustrates a flow chart of a method for adjusting a resonant driver according to another embodiment of the present invention.

FIG. 4 illustrates a flow chart of a method for adjusting a resonant driver according to an embodiment of the present invention. FIG. 4 includes steps 400–420, with reference to the embodiment in FIG. 3, for sake of convenience.

Initially the elements selected for resonant driver circuit 310 are selected such that the output signal has an output frequency that is approximately equal to the desired resonant frequency, step 400.

Next, resonant driver circuit 310 drives signal line 380, while sensing circuit 320 monitors the difference in phase between an external oscillator on external reference element 350 and the signal on signal line 380, step 410.

In response to the difference in phase, control logic 340 selects tunes bank of tunable components 330, thereby reducing the phase difference. As a result, the output frequency of resonant circuit 300 will be the desired resonant frequency.

In one embodiment of the present invention, bank of tunable components 330 is a variable capacitor, and control circuit 340 varies the capacitance.

Preferably, the above process is periodically repeated, thus the output frequency of resonant driver 300 is repeatedly monitored and adjusted. By continually fine-tuning the output frequency to the desired resonant frequency, the amount of power consumed is reduced.

Liquid Crystal Drivers

Figure 5:
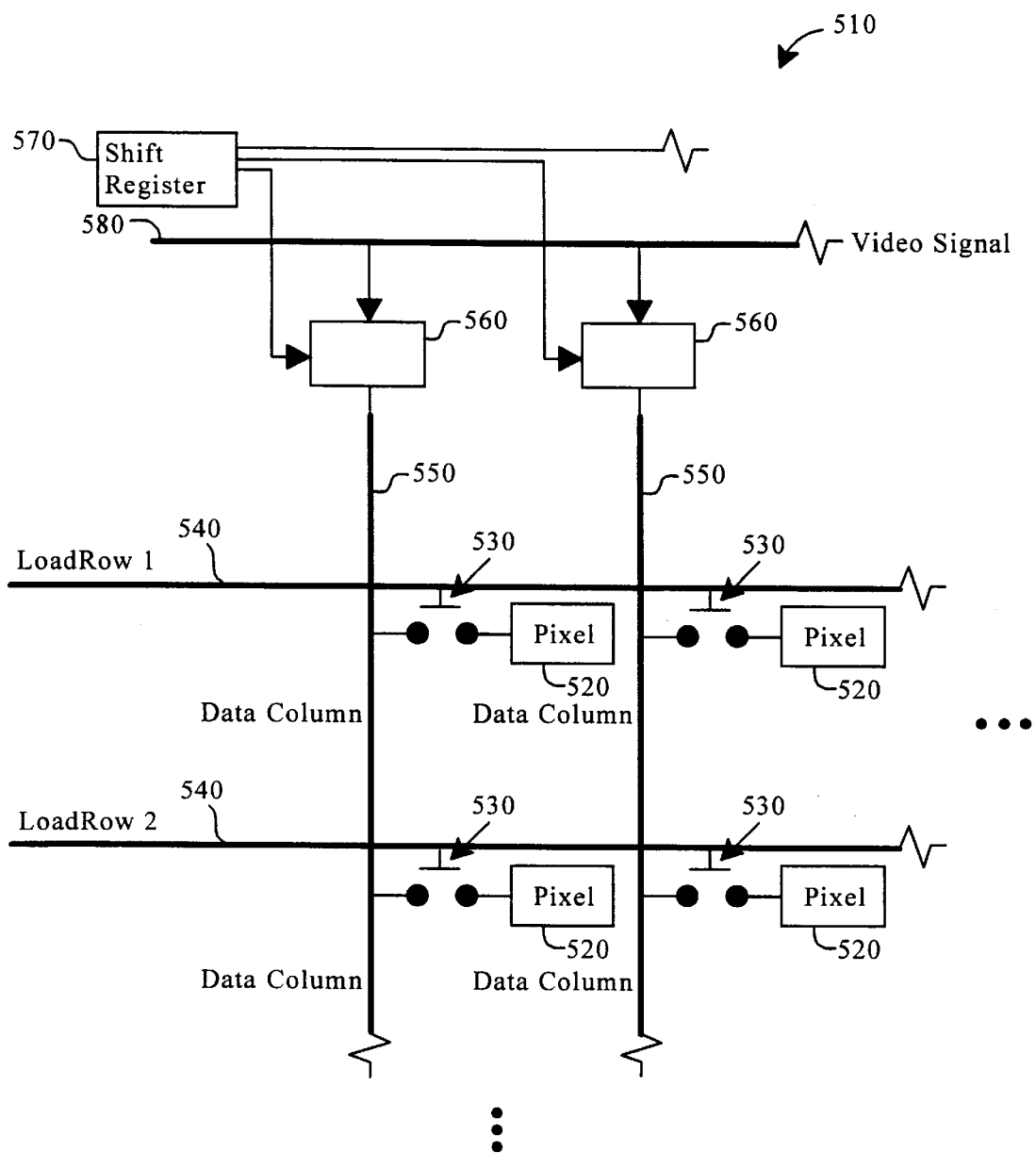
FIG. 5 illustrates a portion of a typical liquid crystal display.

FIG. 5 illustrates a portion of a typical liquid crystal display 510. Display 510 includes pixels 520, pixel driving gates 530, load rows 540, data columns 550, data column drivers 560, a shift register 570, and a video input line 580.

As is illustrated, pixels 520 are arraigned into rows and columns of pixels. Each pixel 520 in a row of pixels includes a pixel driving gate 530 controlled by a common load row 540. Typically only one load row 540 is active at any one time. Each pixel 520 in a column of pixels is driven by a common data column 550.

Data columns 550 are driven by data column drivers 560. Each data column driver 560 typically samples a video signal on video input line 580, in response to a signal from shift register 570. Preferably only one data column driver 560 samples the video signal at any one time.

Analog Video Embodiment

Figure 6:
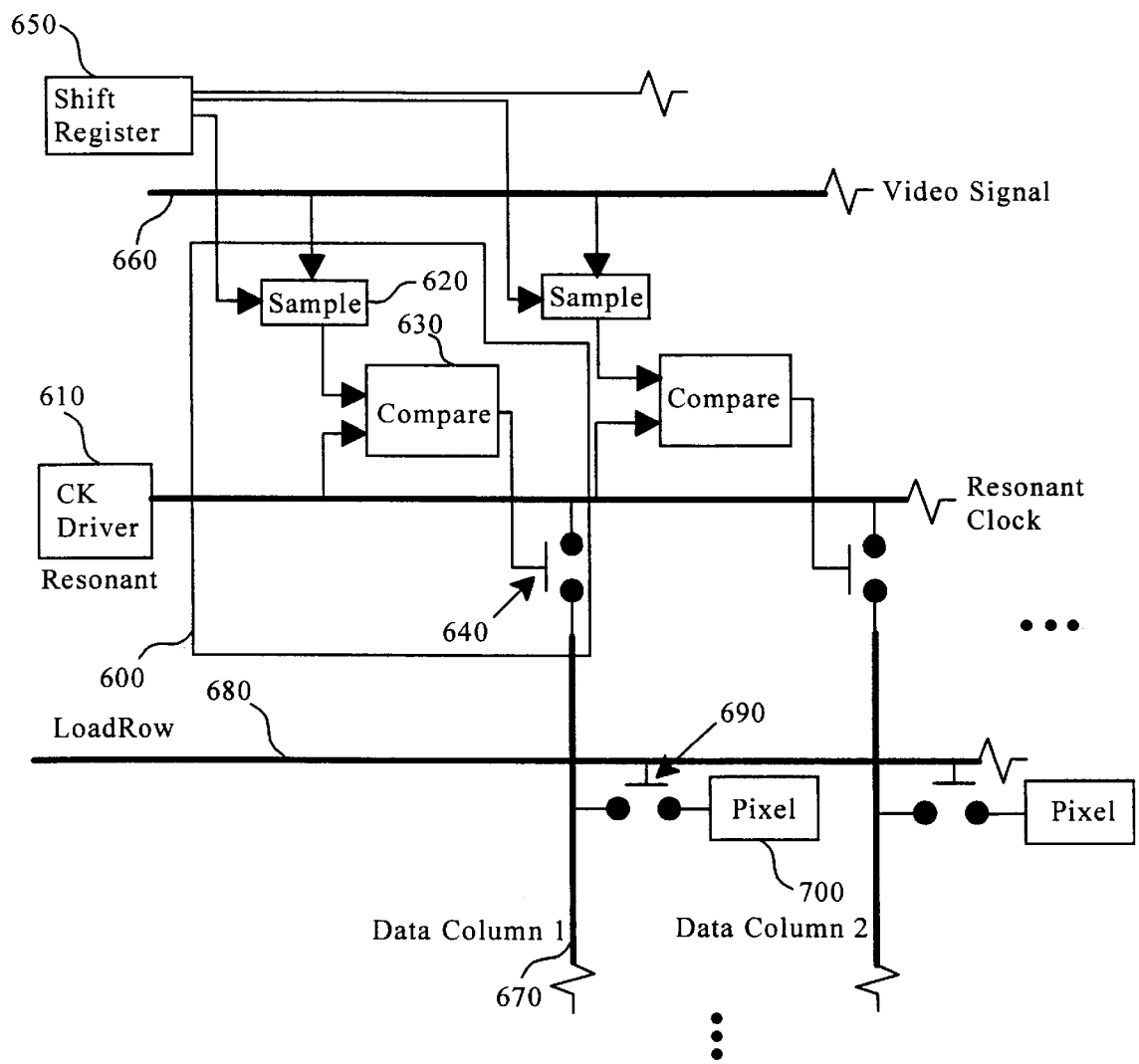
FIG. 6 is a block diagram of a resonant display driver for driving a column on a display, according to an embodiment of the present invention.

FIG. 6 is a block diagram of a resonant display driver 600 for driving a column on a display, according to an embodiment of the present invention. Resonant display driver 600 includes a resonant clock driver 610, a sampling circuit 620, a comparator 630 and a column driving switch 640. FIG. 6 also includes a shift register 650, a video input line 660, a data column line 670, a load row line 680, a pixel driving gate 690, and a pixel 700.

Resonant clock driver 610 typically comprises a resonant driver, as is well-known to one of ordinary skill in the art. Resonant clock driver 610 provides a resonant clock signal having a time-dependent voltage or amplitude. A single resonant clock driver 610 is required to provide the resonant clock signal to all resonant display drivers 600.

Sampling circuit 620 is provided to sample the amplitude or the intensity (voltage) of an analog video signal on video input line 660. Sampling circuit 620 is coupled to shift register 650 and captures a sampled signal from video input line 660 in response to a signal from shift register 650. Sampling circuit 620 may comprise any well-known analog sampling circuit, or a sampling circuit described in FIG. 8, below.

Comparator 630 is coupled to the output of sampling circuit 620 and to the output of resonant clock driver 610. Comparator 630 compares the analog value of the sampled signal from sampling circuit 620 to the time-dependent amplitude of the resonant clock signal. As a result of the comparison, comparator 630 typically asserts a logical "1" output signal or a logical "0" output signal. The logical "1" output signal may be active high or active low, depending upon the particular embodiment of column driving switch 640.

Column driving switch 640 is coupled to resonant clock driver 610 and data column line 670. Column driving switch 640 is typically embodied as a MOS transistor having a gate controlled by the output from comparator 630. Typically, when comparator 630 asserts an logical "1" output signal, column driving switch 640 is closed, and when comparator 630 asserts an logical "0" output signal, column driving switch 640 is open.

Figure 7:
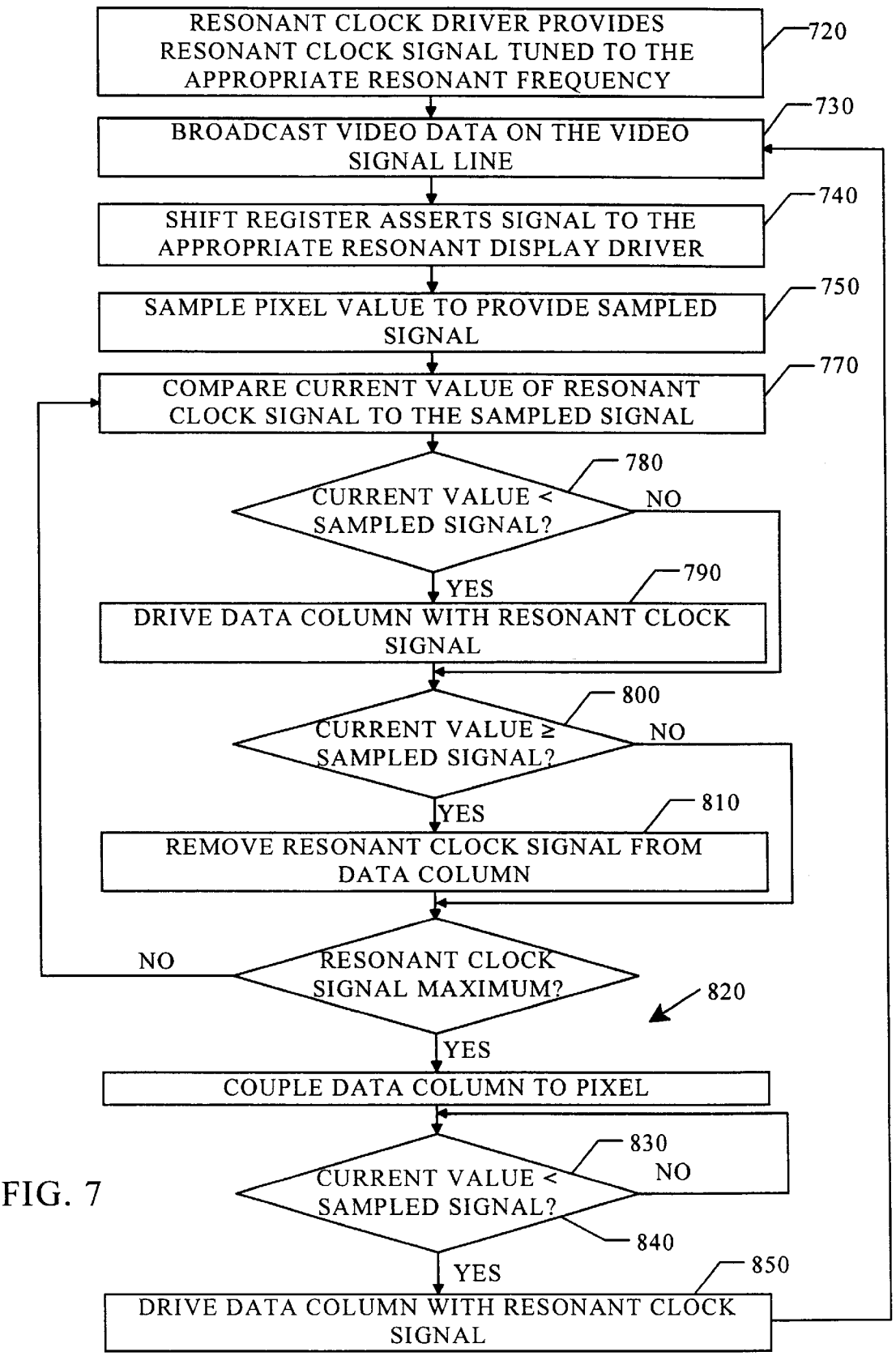
FIG. 7 illustrates a flow chart of a method for driving a data column in a liquid crystal display according to an embodiment of the present invention.

FIG. 7 illustrates a flow chart of a method for driving a data column in a liquid crystal display according to an embodiment of the present invention. FIG. 7 includes steps 720–820, with references to the embodiment in FIG. 6 for sake of convenience.

Initially, resonant clock driver 610 is provided for providing the resonant clock signal, step 720. A value for a pixel is broadcast along video input line 660, step 730. Next, shift register 650 asserts a signal to an appropriate resonant display driver 600, step 740. In response to shift register 650 signal, sampling circuit 630 samples the value for the pixel and stores the value as the sampled signal, step 750. The sampled signal is typically a voltage level.

Next, comparator 630 compares the time-dependent amplitude of the resonant clock signal to the analog value of the sampled signal, step 770. When the time-dependent amplitude of the resonant clock signal is less than the analog value of the sampled signal, comparator 630 preferably asserts a logical 1 output signal, step 780. In response to the logical 1 output, column driving switch 640 is closed, and resonant clock driver 610 is coupled to drive data column line 670, step 790.

When the time-dependent amplitude of the resonant clock signal is greater than the analog value of the sampled signal, comparator 630 preferably asserts a logical 0 output signal, step 800. In response to the logical 0 output, column driving switch 640 is opened, and resonant clock driver 610 is decoupled from data column line 670, step 810.

After resonant clock signal reaches its maximum amplitude, load row 680 is pulsed, thereby turning on pixel driving gate 690 and coupling data column line 670 to pixel 700, step 820. The charge stored on data column line 670 is thus shared, or impressed, onto pixel 700.

In the preferred embodiment of the present invention, the timing of the signal on load row 680 relative to the maximum amplitude of the resonant clock signal is easily adjustable. Further, the maximum amplitude of the resonant clock signal is predetermined to be greater than the maximum value of a sampled signal. Typically, the resonant frequency of the resonant clock signal is approximately equal to the horizontal sweep frequency of the display.

After load row 680 is pulsed, comparator 630 compares the time-dependent amplitude of the resonant clock signal to the analog value of the sampled signal, step 830. When the time-dependent amplitude of the resonant clock signal is less than the analog value of the sampled signal, comparator 630 preferably asserts a logical 1 output signal, step 840. In response to the logical 1 output, column driving switch 640 is closed, and resonant clock driver 610 is recoupled to drive data column line 670, step 850. The above process is preferably then repeated for the next row (or line) of video data.

Figure 8:
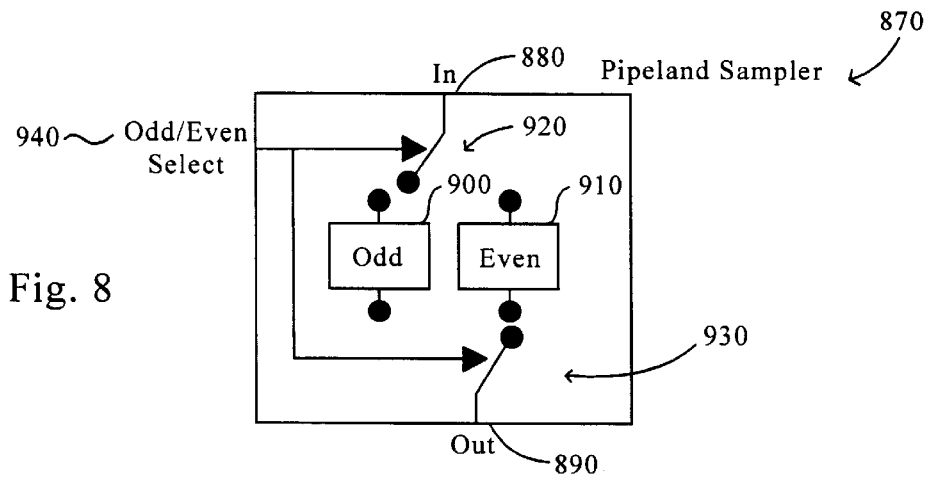
FIG. 8 illustrates a block diagram of a pipelined sampling circuit according to an embodiment of the present invention.

FIG. 8 illustrates a block diagram of a pipelined sampling circuit 870 according to an embodiment of the present invention. Pipelined sampling circuit 870 includes an input 880, an output 890, a first storage buffer 900, a second storage buffer 910, an input selector 920, an output selector 930, and a control input 940.

As illustrated, input selector 920 determines which storage buffer is used to store incoming data, and output selector 930 determines which storage buffer is used for output of data. Input selector 920 and output selector 930 are controlled by control input 940.

With typical non-interlaced video displays, lines of video data are addressed sequentially, with even lines following odd lines. Using pipelined sampling circuit 870 allows sampling of one line of data while providing sampled values of a previous line of data to a data column line.

In typical operation, input 880 receives a video signal from a first line of video data. Control input 940 controls input selector 920 such that the video signal is sampled and stored in first storage buffer 900. When the first line of video data has been sampled, input 880 receives a video signal from a second line of video data. Next, control input 940 controls input selector 920 such that the video signal is sampled and stored in second storage buffer 910. Further, control input 940 controls output selector 930 so that the sampled video signal stored in first storage buffer 900 is output from pipelined sampling circuit 870.

An advantage of using pipelined sampling circuit 870 for sampling circuit 620, is that pipelined sampling circuit 870 can simultaneously sample video data from a second line of video data while outputting sampled data from a first line of video data. In this manner, line sampling and display processing occurs at the full video rate.

Digital Video Embodiment

Figure 9:
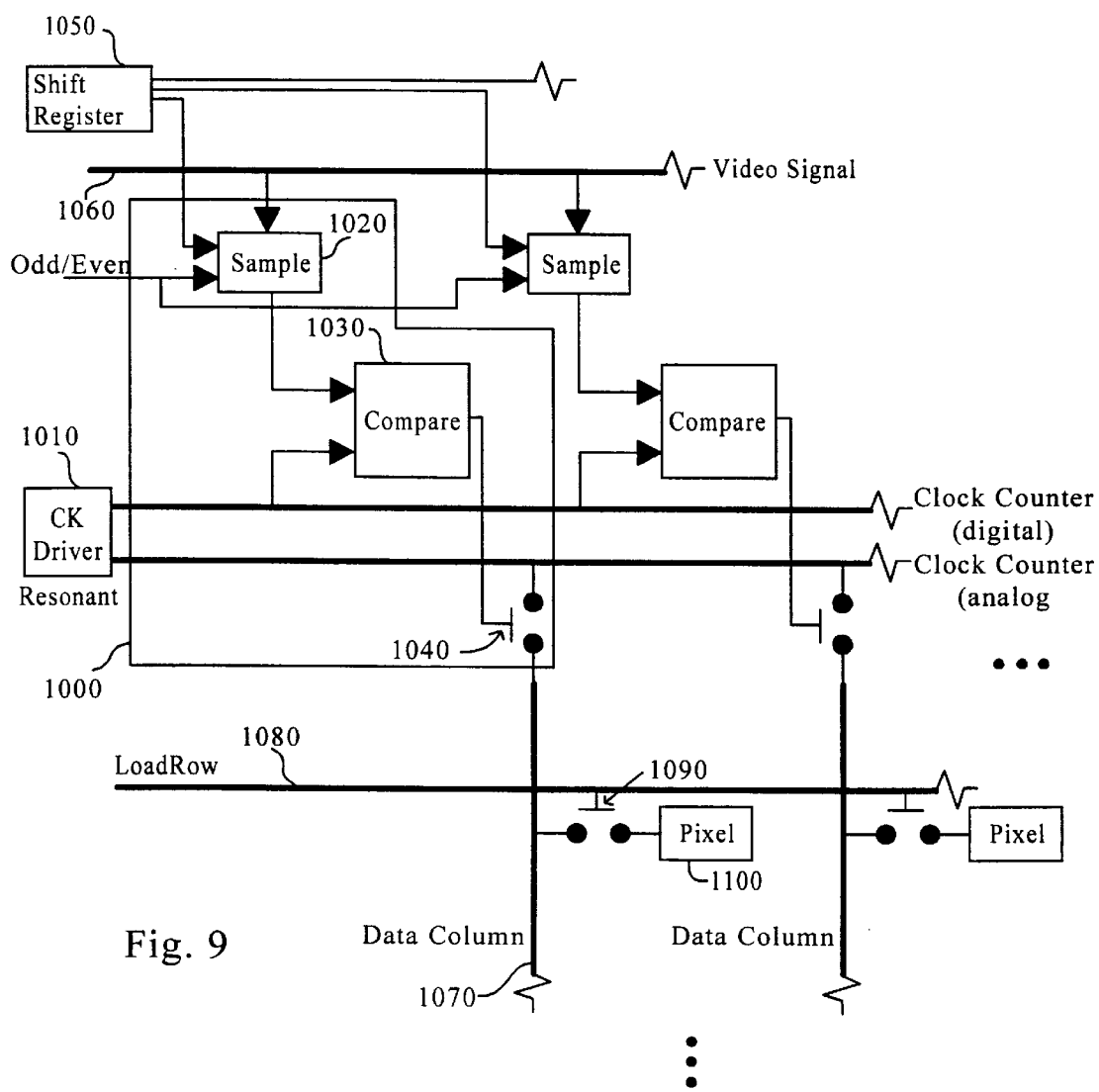
FIG. 9 is a block diagram of a resonant display driver for driving a column on a display, according to an embodiment of the present invention.

FIG. 9 is a block diagram of a resonant display driver 1000 for driving a column on a display, according to an embodiment of the present invention. Resonant display driver 1000 includes a resonant clock driver 1010, a sampling circuit 1020, a comparator 1030, and a column driving switch 1040. FIG. 9 also includes a shift register 1050, a digital video input line 1060, a data column line 1070, a load row line 1080, a pixel driving gate 1090, and a pixel 1000.

Resonant clock driver 1010 typically comprises a resonant driver as was described above. Resonant clock driver 1010 provides an analog resonant clock signal and a digital resonant clock signal. The analog resonant clock signal includes a time-dependent voltage amplitude and the digital resonant clock signal includes a time-dependent digital value corresponding to the time-dependent voltage amplitude.

Sampling circuit 1020 is provided to sample the value of the digital video on video input line 1060, in response to a signal from shift register 1050, to form a sampled signal. Sampling circuit 1020 is illustrated incorporating a digital sampler including the concepts of the pipelined sampling circuit as described in FIG. 8, above. Alternatively, any conventional digital sampling circuit can be used in alternative embodiments of the present invention.

Comparator 1030 is coupled to both the outputs of sampling circuit 1020 and resonant clock driver 1010. Comparator 1030 preferably compares the digital value of the sampled signal from sampling circuit 1020 to the time-dependent digital value of the resonant clock signal, and asserts a logical "1" output signal or a logical "0" output signal. The logical "1" output signal may be active high or active low, depending upon the particular embodiment of column driving switch 1040.

Comparator 1030 asserts a logical "1" output signal when the digital value of the time-dependent digital value is less than the digital value of the sampled signal, and comparator 1030 asserts a logical "0" output signal when the digital value of the time-dependent digital value is greater than the digital value of the sampled signal. Again, the logic may be active high or active low, depending upon the specific embodiment.

Column driving switch 1040 is coupled to resonant clock driver 1010 and data column line 1070. Column driving switch 1040 is typically embodied as a MOS transistor having a gate controlled by the output from comparator 1030. The gate is preferably closed when comparator 1030 asserts an logical "1" output signal, and is preferably open when comparator 1030 asserts an logical "0" output signal.

The operation of the digital video embodiment described is similar to the analog video embodiment described above. Instead of sampling or comparing analog voltages, digital values are sampled and compared. Data column lines 1070 are still driven with analog resonant clock signals at the appropriate time.

Digital Analog Converters

Figure 10:
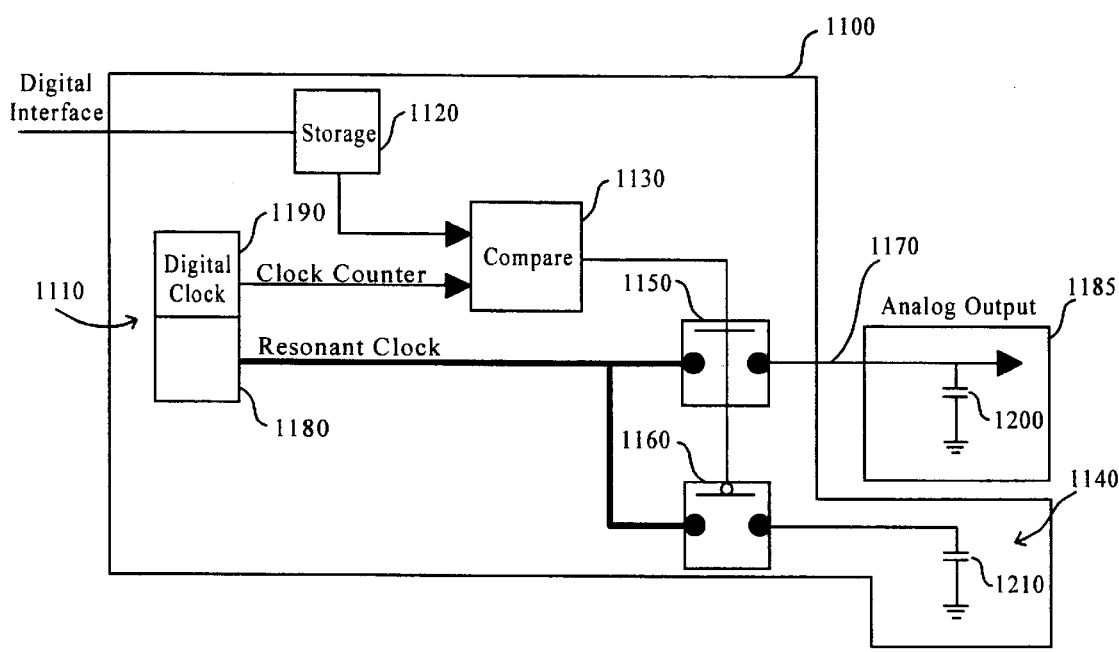
FIG. 10 is a block diagram of a resonant digital to analog converter, according to an embodiment of the present invention.

FIG. 10 is a block diagram of a resonant digital to analog converter (DAC) 1100, according to an embodiment of the present invention. DAC 1100 preferably includes a resonant clock driver 1110, a storage 1120, a comparator 1130, a capacitance matching circuit 1140, a first switch 1150, a second switch 1160, and an output 1170. FIG. 10 also illustrates a load circuit 1180 coupled to output 1170.

Resonant clock driver 1110 typically comprises a resonant clock circuit 1180 and a digital clock circuit 1190. Resonant clock circuit 1180 provides a resonant clock signal (analog) having a time-varying value, while digital clock circuit 1190 provides a digital clock signal also having a time-varying value. Resonant clock circuit 1180 is tuned for load circuit 1180 at a particular resonant frequency.

The value of the digital clock signal typically corresponds to the value of the analog clock signal. For example, as the voltage level of the resonant clock signal increases, the value represented by the digital clock signal also increases. Preferably, the digital clock signal is a time-dependent digital value representing the voltage level of the time-dependent value of the resonant clock signal.

In the preferred embodiment, resonant clock circuit 1180 and digital clock circuit 1190 are integral units. In alternative embodiments of the present invention, digital clock circuit 1190 and resonant clock circuit 1180 are separate units.

Storage 1120 typically stores digital values for conversion into an analog voltage. Storage 1120 stores one or more digital values at a time. Input into storage 1120 is preferably performed with any conventional digital interface, for example, a serial stream of bits or parallel bits. Other digital interface techniques can be used to load data into storage 1120 and are contemplated in alternative embodiments of the present invention. Output from storage 1120, a digital value, is preferably also configured as either a serial stream of bits or parallel bits, depending upon the configuration of comparator 1130.

FIG. 10 illustrates comparator 1130 coupled to digital clock circuit 1190 and to storage 1120. Comparator 1130 preferably compares the digital value, output from storage 1120, to the time-dependent digital value of the digital clock signal. Comparator 1130 may include any well-known matching or comparison techniques such as serial bit comparison, parallel bits matching, sub-block matching, etc. In an area-optimized embodiment, a bit-serial comparator is used so as to reduce the size of comparator 1130; in a power optimized embodiment, a bit-parallel comparator is used to reduce signal transitions and therefore power.

As a result of the comparison, comparator 1130 typically asserts a logical "1" output signal or a logical "0" output signal. The logical "1" output signal may be active high or active low, depending upon the particular embodiment of first switch 1150 and second switch 1160.

First switch 1150 is coupled to resonant clock circuit 1180 and to output 1170. First switch 1150 is typically embodied as a n-MOS transistor having a gate controlled by the output from comparator 1130. With this embodiment, when comparator 1130 asserts an logical "1" output signal, first switch 1150 is closed, and when comparator 1130 asserts an logical "0" output signal, first switch 1150 is open.

Second switch 1160 is coupled to resonant clock circuit 1180. Second switch 1160 is typically embodied as a p-MOS transistor having a gate also controlled by the output from comparator 1130. With this embodiment, when comparator 1130 asserts an logical "1" output signal, second switch 1160 is open, and when comparator 1130 asserts an logical "0" output signal, second switch 1160 is closed.

It is preferred that first switch 1150 and second switch 1160 are opposites, thus when one switch is open, the other is closed. Other conventional switching circuits are well-known and are used in alternative embodiments of the present invention for first switch 1150 and second switch 1160.

Typically, load circuit 1180 is modeled as a capacitor 1200 having a particular capacitance that can be measured, or predetermined. This particular capacitance is then used to determine the value for capacitor 1210 within capacitance matching circuit 1140. Preferably, the capacitance of capacitor 1210 is substantially similar to the capacitance of capacitor 1200, although other relationships can also be used. As illustrated in FIG. 10, capacitance matching circuit 1140 is coupled to the output of second switch 1160.

In an alternative embodiment of the present invention, second switch 1160 and capacitance matching circuit 1140 need not be included in DAC 1100. By providing capacitance matching circuit 1140 and second switch 1160, when resonant clock circuit 1180 is not coupled to load circuit 1180, resonant clock circuit 1180 "sees" capacitor 1210. When capacitor 1210 and capacitor 1200 are substantially similar, resonant clock circuit circuit maintains substantially the same resonant clock frequency.

Figure 11:
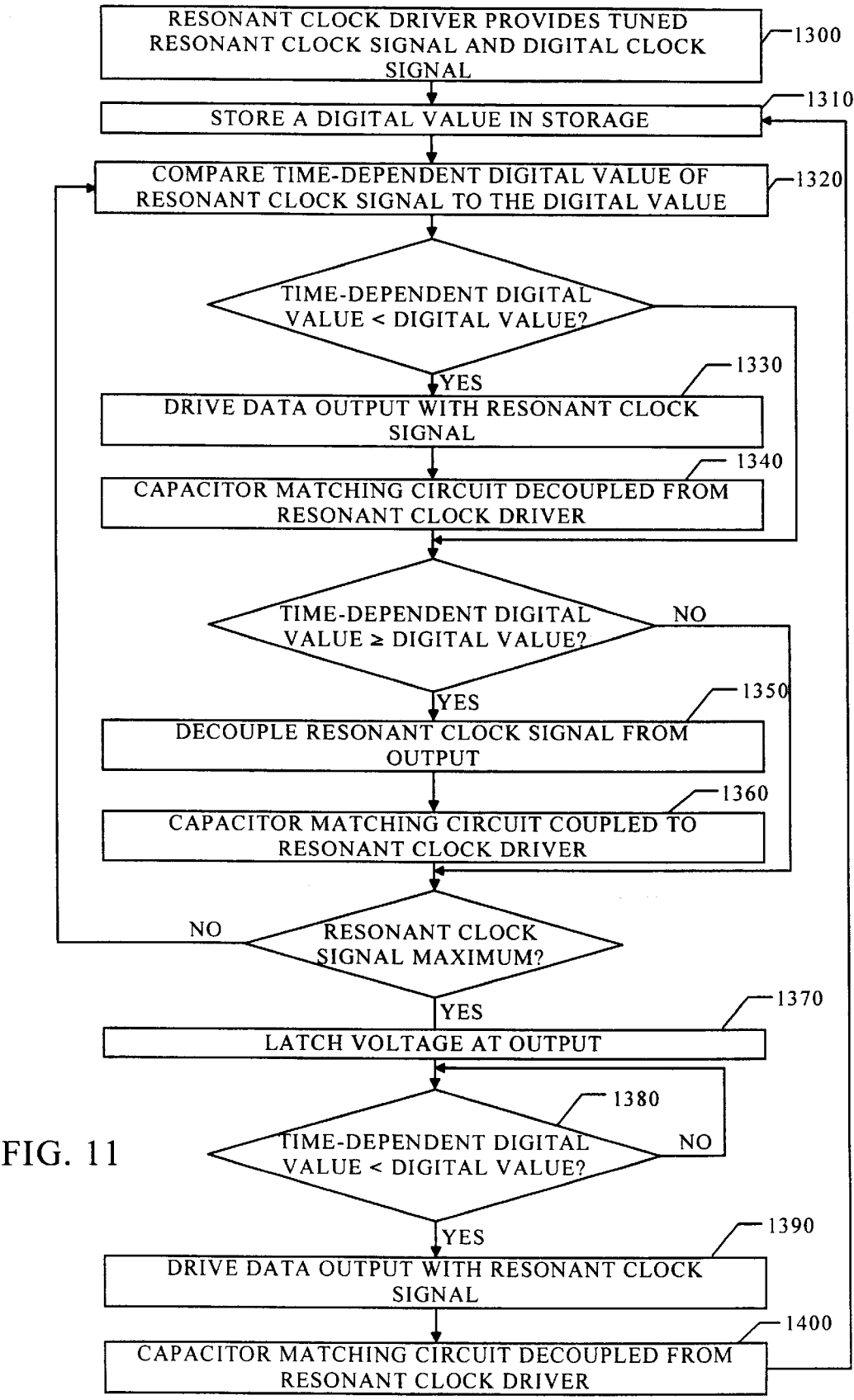
FIG. 11 illustrates a flow chart of a method for converting a digital value to an analog value according to an embodiment of the present invention.

FIG. 11 illustrates a flow chart of a method for converting a digital value to an analog value according to an embodiment of the present invention. FIG. 11 includes steps 1300–1400, with references to the embodiment in FIG. 10 for sake of convenience.

Initially, resonant clock driver 1110 is provided for providing the resonant clock signal having a time-dependent value, and for providing the digital clock signal having a time-dependent digital value, step 1300. The frequency of operation of DAC 1100 is determined by the frequency of the resonant clock signal. In other words, resonant clock driver 1110 is tuned such that the resonant clock signal resonates at the same frequency as the desired frequency of operation of the digital to analog conversion. In a preferred embodiment, once the desired frequency of operation of DAC 1110 is determined, resonant clock driver 1110 is tuned to resonate at the desired frequency.

In step 1310, a digital value to be converted to analog form is input to storage 1120.

Next, comparator 1130 compares the time-dependent digital value to the digital value from storage 1120, step 1320. When the time-dependent digital value is less than the digital value of storage 1120, comparator 1130 preferably asserts a logical 1 output signal. In response to the logical 1 output, first switch 1150 is closed, and resonant clock driver 1110 is coupled to output 1170, step 1330. Further, in response to the logical 1 output, second switch 1160 is opened, step 1340.

When the time-dependent digital value is greater than the digital value of storage 1120, comparator 1130 preferably asserts a logical 0 output signal. In response to the logical 0 output, first switch 1150 is opened, and resonant clock driver 1110 is decoupled from output 1170, step 1350. Further, in response to the logical 0 output, second switch 1160 is closed, step 1360.

After resonant clock signal reaches its maximum amplitude, load circuit 1180 latches the analog voltage across capacitor 1200, step 1370. The analog voltage across capacitor 1200 is thus the analog representation of the digital value stored in storage 1120. Another sample and hold stage may be provided to latch the voltage across capacitor 1200.

In the preferred embodiment of the present invention, the timing of step of latching the analog voltage relative to the maximum amplitude of the resonant clock signal is easily determinable and adjustable. Further, the maximum value of the digital clock signal is predetermined to be greater than the maximum value of the digital value.

After the voltage is latched, comparator 1130 compares the time-dependent digital value to the digital value, step 1380. When the time-dependent digital value is less than the digital value of storage 1120, comparator 1130 preferably asserts a logical 1 output signal. In response to the logical 1 output, first switch 1150 is closed, and resonant clock driver 1110 is coupled to output 1170, step 1390. Further, in response to the logical 1 output, second switch 1160 is opened, step 1400.

The above process is preferably then repeated for the next digital value stored in storage 1120.

Conclusion

In the foregoing specification, the invention has been described with reference to specific exemplary embodiments thereof. Many changes or modifications are readily envisioned. For example, it is envisioned that the method disclosed in FIG. 4 is adapted for measuring a capacitance of an external high-precision capacitor, the capacitance from the bank of tunable components, and calibrating the resonant frequency by adjusting the capacitance of the bank of tunable components. Combinations of elements from the embodiments described above are also contemplated in alternative embodiments of the present invention. Further, well-known feedback schemes are also contemplated in alternative embodiments.

The presently claimed inventions may also be applied to many areas of technology such as clock signals for a liquid crystal display for computers or televisions or the like, for computer processors, for memory devices, or any other device requiring clock signals having low power consumption. Many changes or modifications are readily envisioned, such as, the resonant clock circuit may include two separate portions, a digital clock portion and an analog clock portion. Further, in other embodiments the digital clock circuit is not part of the resonant clock circuit.

The presently claimed inventions may also be applied to many areas of technology such as active or passive liquid crystal displays for computers, televisions, high-definition televisions, portable digital devices, video cameras, and the like.

The presently claimed inventions may also be applied to many areas of technology requiring digital to analog conversion such as active or passive liquid crystal displays, computers, televisions, high-definition televisions, portable digital devices, video recorders, digital audio tape players, cameras, printers, plotters, scanners, and the like.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for forming a resonant driver for driving a load circuit at a resonant frequency, comprising the steps of:

providing a bank of tunable components;

providing a resonant driver circuit coupled to the bank of tunable components and to the load circuit;

driving the load circuit with the resonant driver circuit at approximately the resonant frequency;

providing a power dissipation sensor coupled to the resonant driver circuit;

determining the power dissipation of the resonant driver circuit;

providing a control circuit coupled to the power dissipation sensor and to the bank of tunable components; and tuning the bank of tunable components with the control circuit in response to the power dissipation of the resonant driver circuit.

2. The method of claim 1 wherein the step of tuning the bank comprises the step of tuning the bank of tunable components to reduce the power dissipation of the resonant driver circuit.

3. A method for forming a resonant driver for driving a load circuit at a resonant frequency, comprising the steps of:

providing a bank of tunable components;

providing a resonant driver circuit coupled to the bank of tunable components and to the load circuit;

driving the load circuit with the resonant driver circuit with a signal at a frequency approximately equal to the resonant frequency;

providing an external reference element;

providing an internal reference element;

providing a reference sensor coupled to the resonant driver circuit, to the external reference element, and to the internal reference element;

determining a difference between the external reference element and the internal reference element with the reference sensor;

providing a control circuit coupled to the reference sensor and to the bank of tunable components; and electronically tuning the bank of tunable components with the control circuit in response to the difference.

4. The method of claim 3 wherein the step of electronically tuning the bank of tunable components comprises the step of selecting a capacitance for the bank of tunable components with the control circuit; and wherein the external reference element is a capacitor and the internal reference element is the capacitance of the bank of tunable components.

5. A liquid crystal display including a display circuit and harmonic driver for driving the display circuit at a resonant frequency, comprising:

a tunable capacitor;

a resonant driver circuit coupled to the tunable capacitor and to the display circuit, for driving the display circuit at approximately the resonant frequency;

a power dissipation sensor coupled to the resonant driver circuit, for determining the power dissipation of the resonant driver circuit; and control logic coupled to the tunable capacitor and to the power dissipation sensor, for monitoring the power dissipation of the resonant driver circuit and for tuning the tunable capacitor in response to the power dissipation of the resonant driver circuit.

6. The liquid crystal display of claim 5 wherein the power dissipation sensor comprises a current sensor.

7. A display driver for driving a data column in a liquid crystal display with a video signal, the display driver comprising:

a resonant clock circuit for providing a resonant clock signal having a time-dependent value;

a sampling circuit for sampling the video signal to form a sampled signal having a sampled value;

a comparator coupled to the resonant clock circuit and to the sampling circuit, the comparator for asserting a first signal when the time-dependent value is less than the sampled value, and for asserting a second signal when the time-dependent value is greater than sampled value; and a switch coupled to the resonant circuit, to the comparator, and to the data column, the switch for coupling the resonant circuit to the data column in response to the first signal, and for decoupling the resonant circuit from the data column in response to the second signal.

8. The display driver of claim 7 wherein the video signal comprises analog data and the sampled value is a voltage amplitude.

9. A method for driving a data column in a liquid crystal display with a video signal, the method comprising the steps of providing a resonant clock signal having a time-dependent value;

sampling the video signal to form a sampled signal having a sampled value;

comparing the time-dependent value to the sampled value;

asserting a first signal when the time-dependent value is less than the sampled value;

asserting a second signal when the time-dependent value is greater than sampled value;

coupling the resonant clock signal to the data column in response to the first signal; and decoupling the resonant clock signal from the data column in response to the second signal.

10. The method of claim 9 wherein the step of providing a resonant clock signal further comprises providing a digital clock signal having a time-dependent digital value corresponding to the time-dependent value of the resonant clock signal.

11. The method of claim 10 wherein the step of comparing the time-dependent value comprises comparing the time-dependent digital value to the sampled value;

wherein the step of asserting a first signal comprises asserting the first signal when the time-dependent digital value is less than the sampled value; and wherein the step of asserting a second signal comprises asserting the second signal when the time-dependent digital value is greater than sampled value.

12. A method for driving a display element with a resonant clock signal having a time-dependent value, the method comprising the steps of sampling a video signal to form a sampled value;

comparing the time-dependent value to the sampled value;

coupling the resonant clock signal to the data column when the time-dependent value is less than the sampled value; and decoupling the resonant clock signal from the data column when the time-dependent value is greater than sampled value.

13. The method of claim 12 wherein the step of coupling the data column occurs after the step of decoupling the resonant clock signal.

14. An apparatus for converting a digital value to an analog value comprising:

a resonant clock circuit for providing a resonant clock signal having a time-dependent value;

a digital clock circuit for providing a digital clock signal having a time-dependent digital value responsive to the time-dependent value;

a storage for storing the digital value;

a comparator coupled to the digital clock circuit and to the storage, the comparator for asserting a first voltage signal when the digital value exceeds the time-dependent digital value and for asserting a second voltage signal when the time-dependent digital value exceeds the digital value; and a switch coupled to the resonant clock signal and to the comparator, the switch for coupling the resonant clock circuit to an output in response to the first voltage signal, and for decoupling the resonant clock circuit from the output in response to the second voltage signal.

15. The apparatus of claim 14 further comprising a load circuit having a capacitance value coupled to the output.

16. The apparatus of claim 15 wherein the apparatus further comprises a capacitance matching circuit having a capacitance substantially similar to the capacitance value; and wherein the switch is also coupled to the capacitance matching circuit for coupling the resonant clock circuit to the capacitance matching circuit in response to the second voltage signal, and for decoupling the resonant clock circuit from the capacitance matching circuit in response to the first voltage signal.

17. A method for converting a digital value to an analog value, the method comprising the steps of:

storing the digital value into a storage;

providing a resonant clock signal having a time-dependent value and a digital clock signal having a time-dependent digital value responsive to the time-dependent value;

comparing the time-dependent digital value to the digital value;

asserting a first voltage signal when the digital value exceeds the time-dependent digital value;

asserting a second voltage signal when the time-dependent digital value exceeds the digital value;

coupling the resonant clock circuit to an output in response to the first voltage signal; and decoupling the resonant clock circuit from the output in response to the second voltage signal.

18. The method of claim 17 wherein the time-dependent value is a voltage.

19. A method for converting a digital value to an analog value using a resonant clock circuit and a digital clock circuit, the resonant clock circuit including a resonant clock signal having a time-dependent value and the digital clock circuit including a digital clock signal having a time-dependent digital value responsive to the time-dependent value, the method comprising the steps of:

comparing the time-dependent digital value to the digital value;

coupling the resonant clock circuit to an output when the digital value exceeds the time-dependent digital value; and decoupling the resonant clock circuit from the output when the time-dependent digital value exceeds the digital value.

20. The method of claim 19 further comprising the steps of:

coupling the resonant clock circuit to a capacitance matching circuit when the time-dependent digital value exceeds the digital value; and decoupling the resonant clock circuit from the capacitance matching circuit when the digital value exceeds the time-dependent digital value.

* * * * *